United States Patent [19]

Yamada

[11] Patent Number: 4,960,648
[45] Date of Patent: Oct. 2, 1990

[54] LAMINATED MATERIALS AND LAMINATED ARTICLES

[75] Inventor: Toyokazu Yamada, Himeji, Japan

[73] Assignee: Idemitsu Petrochemical Company Limited, Tokyo, Japan

[21] Appl. No.: 336,281

[22] Filed: Apr. 12, 1989

[30] Foreign Application Priority Data

Apr. 14, 1988 [JP] Japan .................................. 63-92562
Apr. 14, 1988 [JP] Japan .................................. 63-92563

[51] Int. Cl.$^5$ ............................................ B32B 27/08
[52] U.S. Cl. ............................... 428/476.3; 428/474.7; 428/475.2; 428/483; 428/500; 428/516; 428/517; 428/518; 428/688
[58] Field of Search ............... 428/500, 518, 517, 515, 428/483, 688, 516, 474.7, 475.2; 156/244.1

[56] References Cited

U.S. PATENT DOCUMENTS

| | | | |
|---|---|---|---|
| 3,900,670 | 8/1975 | Ikeda et al. | 428/336 |
| 4,389,438 | 6/1983 | Ohtsuki et al. | 428/461 |
| 4,528,235 | 7/1985 | Sacks | 428/220 |
| 4,567,089 | 1/1986 | Hattori | 428/213 |
| 4,618,528 | 10/1986 | Sacks | 428/474.4 |
| 4,842,951 | 6/1989 | Yamada et al. | 428/516 |

FOREIGN PATENT DOCUMENTS

| | | |
|---|---|---|
| 0204324 | 10/1986 | European Pat. Off. . |
| 51-26478 | 8/1976 | Japan . |
| 52-63283 | 5/1977 | Japan . |
| 57-15963 | 1/1982 | Japan . |
| 59-165654 | 9/1984 | Japan . |
| 60-26028 | 6/1985 | Japan . |

Primary Examiner—Edith Buffalow

[57] ABSTRACT

A laminated material is prepared in which a resin composition layer (A) containing a thermoplastic resin and an inorganic filler in a scaly or non-scaly form in an amount from 20% to 80% by weight of the total weight of the thermoplastic resin and the filler interposes a resin composition layer (B) containing a thermoplastic resin and an inorganic filler in an amount from 30% to 70% by weight of the weight of the inorganic filler contained in the resin composition layer (A), the filler being in a scally form when the filler in the layer (A) is in a scaly form or being in a non-scaly form when the filler in the layer (A) is in a non-scaly form with a thermoplastic resin layer.

For the laminated material in which the scaly inorganic filler is contained in the layer (A), the layer (B) containing the thermoplastic resin and the non-scaly inorganic filler in the amount of 20% to 80% by weight of the total weight of the thermoplastic resin and the non-scaly filler is interposed between the layer (A) containing the thermoplastic resin and the scaly inorganic filler in the amount of 20% to 80% by weight of the total weight of the thermoplastic resin and the scaly inorganic filler and the thermoplastic resin (C).

9 Claims, 1 Drawing Sheet

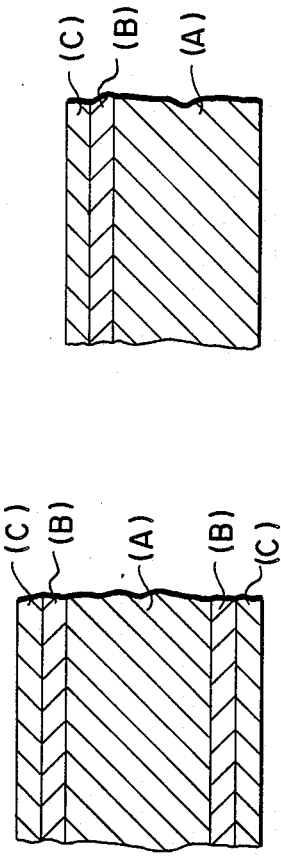

LAMINATED MATERIALS AND LAMINATED ARTICLES

BACKGROUND OF THE INVENTION

1. Field of the Invention

The present invention relates to a laminated material and a laminated article such as a container and, more particularly, to a laminated material which is excellent in strength, toughness, thermal resistance, readiness to burn, punchability, and peelability from a lid member as well, and to a laminated article made out of such a laminated material.

2. Description of Related Art

Recently, in many cases, retort food is cooked as it is packed in a container by placing it in an electronic oven or in boiling water.

Such a container is heated while it still contains food therein so that a material for the container should have excellent properties with respect to thermal resistance, resistance to liquation, and oil resistance as well as a high mechanical strength and toughness. Additionally, the material should be readily burned from the viewpoint of pollution prevention and security of incinerators.

Heretofore, in order to meet with such requirements, for example, a resin composite sheet containing an inorganic filler has been thermally molded such as vacuum-molded or pressure molded or blow-molded to containers or a multi-layer sheet containing a resin composition layer with a large quantity of an inorganic filler and a resin layer with substantially no inorganic filler is molded to packing containers.

For example, Japanese Patent Kokai No. 264,478/1976 and Japanese Patent Kokoku No. 26,028/1985 disclose a packing container formed by a three layer sheet in which a high filler layer containing a larger quantity of a filler is interposed with a low filler layer containing no or a lesser quantity of a filler. This three-layer sheet is weak in adhesion between the layers so that when it is punched to packing containers, the prior art sheet causes filaments or whiskers on an edge of the container or the layers are likely to be delaminated.

Furthermore, Japanese Patent Kokai No. 63,283/1977, No. 15,963/1982 and No. 165,654/1984 disclose a sheet in which a layer containing no inorganic filler or an inorganic filler in an amount of 5% or lower is laminated on one surface or both surfaces of a high filler layer containing a larger quantity of the filler. This sheet is superior in surface characteristics, however, it is poor in adhesion between layers. When punched into containers, filaments or whiskers are caused to occur on an edge of the container and delamination is likely to cause. If a lid member is adhered to a container formed from the sheet as have been disclosed in the related publications, it cannot be peeled off readily because a peeling strength between the base material of the container and the lid member is smaller than the interface between the layers of the multi-layer sheet. If peeled off, the lid member may be broken or an inner layer constituting the container may be torn off.

SUMMARY OF THE INVENTION

Therefore, the present invention has the object to provide a laminated material and a laminated article, particularly a container. The laminated material is remarkably excellent in thermal resistance, strength, toughness, flammability, punchability, and peelability from a lid member as well. The laminated article made of such a laminated material is also superior in those properties.

In order to achieve the above object, the present invention consists of a laminated material having at least a three-layer construction in which a resin composition layer (B) containing a thermoplastic resin and an inorganic filler in a given amount is interposed between a resin composition layer (A) containing a thermoplastic resin and an inorganic filler in a given amount, and a thermoplastic resin layer (C).

In one aspect, the present invention consists of a laminated material which is characterized in that the resin composition layer (B) is interposed between the resin composition layer (A) and the thermoplastic resin layer (C). The resin composition layer (B) contains a thermoplastic resin and an inorganic filler. The inorganic filler is used in an amount of 30% to 70% by weight with respect to the weight of the inorganic filler contained in the resin composition layer (A) and which is in a scaly form when the inorganic filler in the resin composition layer (A) is in a scaly form or which is in a non-scaly form when the inorganic filler in the resin composition layer (A) is in a non-scaly form. The resin composition layer (A) contains an inorganic filler in a scaly or non-scaly form in an amount of 20% to 80% by weight with respect to the total weight of the inorganic filler and the thermoplastic resin.

As one aspect of the present invention, the laminated material having the structure as described above is provided with remarkable characteristics with respect to punchability and peelability from a lid member as well while maintaining excellent characteristics with respect to thermal resistance, toughness, oil resistance, resistance to liquidation, and readiness to burn to be produced by a combination of the layer in which the thermoplastic resin and a large quantity of the inorganic filler are contained with the layer in which substantially no inorganic filler is contained.

As another aspect of the present invention, the laminated material comprises the resin composition layer (B) interposed between the resin composition layer (A) and the thermoplastic resin layer (C), the resin composition layer (A) containing the thermoplastic resin and the inorganic filler in the scaly form in the amount of 20% to 80% by weight with respect to the total weight of the thermoplastic resin and the scaly inorganic filler, and the resin composition layer (B) containing the thermoplastic resin and the inorganic filler in the non-scaly form in the amount of 20% to 80% by weight with respect to the total weight of the thermoplastic resin and the non-scaly inorganic filler.

The present invention provides a laminated sheet which is excellent in thermal resistance, toughness, oil resistance, resistance to liquation, and readiness to burn as well as in punchability and peelability from the lid member.

Furthermore, the present invention provides a laminated article, particularly a packing container, which is prepared from the laminated material with excellent characteristics in respect of thermal resistance, toughness, oil resistance, resistance to liquation, and readiness to burn as well as punchability and peelability from the lid member.

The laminated material according to the present invention may be molded into any arbitrary form of laminated articles such as packing containers, for example, because it is excellent in punchability. Furthermore, since the laminated material has an excellent peelability, the lid member can be readily peeled off from the articles such as containers, when heat-sealed on an opening portion of the laminated articles prepared from the laminated material.

Accordingly, the laminated material and the laminated articles according to the present invention are suitable, for example, for containers to be used in electric ovens and for retort food and the like.

BRIEF DESCRIPTION OF THE DRAWING

FIG. 1 is a cross-sectional view showing one example of the laminated material according to the present invention.

FIG. 2 is a cross-sectional view showing another example of the laminated material according to the present invention.

DETAILED DESCRIPTION OF THE PREFERRED EMBODIMENTS

The laminated material according to the present invention comprises the resin composition layer (A) which, in turn, interposes the resin composition layer (B) with the thermoplastic resin layer (C), the resin composition layer (A) containing the thermoplastic resin and the inorganic filler in the amount of 20% to 80% by weight with respect to the total weight of the thermoplastic resin and the inorganic filler, and the resin composition layer (B) containing the thermoplastic resin and the inorganic filler in the given amount as will be described hereinbelow.

Resin Composition Layer (A)

The resin composition layer (A) is a layer which is provided particularly with characteristics required for the laminated material, sheet and articles such as containers. Thus this layer serves particularly as a substantial portion which can improve its properties when thrown away or burned. At this end, it should have the nature analogous to paper, creating readiness to burn, while maintaining a high degree of thermal resistance as well as toughness required for the laminated articles.

(1) Thermoplastic resins

The theromoplastic resins to be used for the resin composition layer (A) may include, for example, a polyolefinic resin, a poly[vinyl chloride] and a copolymer thereof, a polystyrene and a copolymer thereof, a thermoplastic polyester resin, a polyamide resin and the like. Preferred is the polyolefinic resin.

A polyolefin to be used as a base polymer for the polyolefinic resin may include, for example, a polyethylene such as a high density polyethylene, a middle or low density polyethylene, linear low density polyethylene and so on, a polypropylene such as an isotactic polypropylene, a syndiotactic polypropylene, an atactic polypropylene and so on, a polybutene, poly-4-methylpentent-1, and a mixture thereof.

As the polyolefin, there may be used an olefin copolymer such as ethylene-propylene copolymer, a copolymer of an olefin monomer with a vinyl monomer such as ethylene-vinyl acetate copolymer, ethylene-vinyl chloride copolymer, propylene-vinyl chloride copolymer, and so on.

A denatured polyolefin may also be used as the polyolefin. The denatured polyolefin may include, for example, a polyolefin chemically denatured by an unsaturated carboxylic acid or an anhydride thereof or a derivative thereof. The denatured polyolefin may be prepared by reacting the polyolefin with the unsaturated carboxylic acid, the anhydride thereof, or the derivative thereof in the presence of a radical generator.

In accordance with the present invention, polyethylene or/and polypropylene is/are particularly preferred as the polyolefin.

As the polyethylene or/and polypropylene, there are preferred a high density polyethylene having a melt index (MI) of from 0.05 to 10 grams per 10 minutes, preferably from 0.1 to 5 grams per 10 minutes, and a density of from 0.945 to 0.965 g/cm$^3$, a middle or low density polyethylene having a melt index (MI) of from 0.1 to 20 grams per 10 minutes, preferably from 0.2 to 10 grams per 10 minutes, and a density of from 0.910 to 0.940 g/cm$^3$, and polypropylene having a melt index of from 0.2 to 20 grams per 10 minutes, preferably from 0.2 to 10 grams per 10 minutes, and a density of from 0.890 to 0.910 g/cm$^3$. A mixture of polyethylene with polypropylene may preferably be in a ratio of polyethylene to polypropylene of from 5-70 (polyethylene) to 95-30 (polypropylene), preferably from 10-65 to 90-35. Furthermore, it is preferred that the mixture has a melt index of 5 grams per 10 minutes or lower to improve a thermal moldability.

The thermoplastic resin may be conveniently used in a mixture with one or more of a different kind of elastomers and additives, as needed, in an amount which does not adversely affect the effects to be achieved by the present invention. The elastomers may include, for example, ethylene-α-olefin copolymer, EPR, EPDM, SBR and the like. The additives may include, for example, a colorant, an antioxidant, a plasticizer, a thermal stabilizer, a surface treating agent, a dispersing agent, a ultraviolet absorbing agent, an antistatic agent, an anti-weathering agent, and the like.

(2) Inorganic fillers

Although the inorganic fillers to be used in the resin composition layer (A) are not restricted to a particular form, attention should be paid to a combination of the form of the inorganic fillers for the resin composition layer (A) with the form of the inorganic fillers for the resin composition layer (B). The combination will be summarized in Table 1 below.

TABLE 1

| FORMS OF INORGANIC FILLERS | |
|---|---|
| Resin Composition Layer (A) | Resin Composition Layer (B) |
| Scales | Scales |
| Non-scales | Non-scales |
| Scales | Non-scales |

The inorganic fillers may include, for example, non-scaly inorganic filler such as calcium carbonate, magnesium carbonate, calcium sulfite and barium sulfite and barium sulfate, and scaly inorganic fillers such as silica, talc, titanium oxide, kaolin, clay, aluminum hydroxide, graphite, cerite, barite, vermiculite and mica, and a mixture thereof. Talc, mica and calcium carbonate are particularly preferred.

Talc to be used may have an average particle size ranging usually from 0.5 to 100 μm and may preferably be hydrous magnesium silicate having an average particle size ranging from 1 to 50 μm. Furthermore, it is preferred to use talc having a composition comprising 50%–60% of $SiO_2$, 25%–40% of MgO and other components and demonstrating a burnt weight loss of 1% or lower. It is to be noted, however, that talc is not restricted to the one having the average particle size and the composition as have been described hereinabove and there may be used a variety of talc, for example, which is purified to a high degree of purity or which is treated with an acid to remove impurities.

Furthermore, although talc is not particularly required to be treated by means of an additional means such as surface treatment so as to become compatible with oily substances, it is preferred to subject talc surfaces to hydrooleic treatment in order to improve mechanical characteristics in a sheet prepared from the resin composition containing the talc with the characteristics as have been described hereinabove. The hydrooleic treatment may be carried out by treatment with a surfactant with a hydrooleic group, a polymeric monomer or oligomer capable of froming a hydrooleic group by heating, or with a silane coupling agent.

If calcium carbonate is used as the inorganic filler, it is preferred to use calcium carbonate having an average particle size ranging usually from 0.1 to 50 $\mu$m, preferably from 0.2 to 30 $\mu$m.

It is to be noted that talc is better than calcium carbonate as the inorganic filler because talc can provide a laminated material and laminated article with better thermal resistance, toughness and other properties than calcium carbonate. It is to be noted, however, that an anti-impact strength may be improved by mixing calcium carbonate with talc at the rate of 50% by weight or lower.

For the resin composition layer (A), the inorganic fillers may be admixed with the thermoplastic resin in the amount ranging usually from 20% to 80% by weight, preferably from 25% to 70% by weight, with respect to the total weight of the thermoplastic resin and the inorganic filler. If the amount of the inorganic fillers is less than the lower limit, on the one hand, characteristics with respect to readiness to burn, toughness, thermal resistance and so on are impaired. If the inorganic fillers are used in the amount beyond the upper limit, on the other hand, moldability may be diminished.

A thickness of the resin composition layer (A) may vary with usage of the laminated material according to the present invention and may be advantageously determined in accordance with usages. It is to be noted, however, that, generally speaking, a thicker layer gets better because the resin composition layer (A) constitutes an essential portion of the laminated material according to the present invention. Relatively, the resin composition layer (A) may be as thick as from 40% to 90%, preferably from 50% to 80%, with respect to the total thickness of the laminated material.

Thermoplastic Resin Layer (C)

For the thermoplastic resin layer (C), the thermoplastic resins as have been used for the resin composition layer (A) may be used. It is also noted that a thermoplastic resin different from those used for the layer (A) may also be used. For instance, polyethylene or/and polypropylene is/are preferably used.

It is preferred to provide the layer (C) with favorable thermal resistance and oil resistance as long as it does not become less adhesive to the layer (B) when molded into articles.

Although it is preferred that the thermoplastic resin layer (C) comprises the thermoplastic resin only, the inorganic filler as have been described for the resin composition layer (A) may be added to the layer (C) in an amount of approximately 10% by weight or less with respect to the total weight of the inorganic fillers and the thermoplastic resin. The addition of the inorganic fillers in that amount does not impair the effects to be achieved by the present invention.

The thermoplastic resin layer (C) may be formed in a thickness ranging usually from 10 to 300 $\mu$m, preferably from 20 to 200 $\mu$m.

Resin Composition Layer (B)

The resin composition layer (B) serves as a binder between the resin composition layer (A) and the thermoplastic resin layer (C). The resin composition layer (B) may contain the thermoplastic resins and the inorganic fillers in varying amounts.

(1) Thermoplastic resins

The thermoplastic resins to be used for the resin composition layer (B) may be the same as or different from those used for the resin composition layer (A). The polyolefin is preferred and, more specifically, polyethylene and polypropylene are preferred. Particularly preferred is the thermoplastic resin used for the resin composition layer (B).

(2) Inorganic fillers

The inorganic fillers to be used for the resin composition layer (B) may be in a scaly or non-scaly form and may be used in combination with forms of the inorganic fillers to be used for the resin composition layer (A) as have been demonstrated in Table 1 above.

The inorganic fillers may be the same as those used for the resin composition layer (A). If they are in a form of scales, talc is preferred and, if they are in a form of non-scales, calcium carbonate is preferred. Talc and calcium carbonate have been described in detail hereinabove. Calcium carbonate having an average particle size ranging usually from 0.1 to 50 $\mu$m, preferably from 0.2 to 30 $\mu$m, is particularly preferred.

The resin composition layer (B) may be conveniently chosen upon consideration of a function as a binder, particularly adhesion to the thermoplastic resin layer (C), because essential characteristics such as thermal resistance, toughness and the like are already ensured by the resin composition layer (A).

If the inorganic fillers in the form of scales are used for the resin composition layer (B) in combination with the inorganic fillers in the form of scales for the resin composition layer (A) or if the non-scaly fillers are used in the layer (B) in combination with the non-scaly fillers in the layer (A), as shown in Table 1 above, the inorganic fillers are used for the layer (B) in the amount of 30% to 70% by weight, preferably 35% to 65% by weight, with respect to the weight of the inorganic fillers used in the resin composition layer (A). The amount of the inorganic fillers to be used for the layer (B) may be represented by the following formula:

$$0.3 \leq Bo/Ao \leq 0.7 \text{ if } 0.2 \leq Ao \leq 0.8$$

where

Ao stands for a weight ratio of the inorganic fillers with respect to the total weight of the inorganic fillers and the thermoplastic resin in the resin composition layer (A); and Bo stands for a weight ratio of the inorganic fillers with respect to the total weight of the inorganic fillers and the thermoplastic resin in the resin composition layer (B).

As shown in Table 1 above, when the inorganic fillers in the scaly form are used as an inorganic filler in the layer (A) and, furthermore, when the fillers in the non-scaly form are used in the layer (B), the amount of the non-scaly fillers may range usually from 20% to 80% by weight, preferably from 25% to 70% by weight, with respect to the total weight of the thermoplastic resin and the non-scaly fillers contained in the layer (B).

When the inorganic fillers in the same form, whether scales or non-scales, are used in the layer (A) as that used in the layer (B), as shown in Table 1 above, if the amount of the fillers used for the resin composition layer (B) is smaller than the lower limit, on the one hand, adhesion to the resin composition layer (A) may be impaired, while if the amount of the inorganic fillers used therefore is larger than the upper limit, on the other, adhesion to the theremoplastic resin layer (C) may be impaired. In either case, characteristic of punching laminated articles such as packaging containers from the laminated sheet may be reduced and a compatibility of laminated containers with a lid member is also impaired.

Alternatively, when the inorganic fillers in the form of scales are used for the layer (A) and the inorganic fillers in the form of non-scales are used for the layer (B), as shown in Table 1 above, the fillers in the form of non-scales may be added in the amount ranging usually from 20% to 80% by weight, preferably from 25% to 70% by weight, with respect to the total weight of the non-scaly inorganic fillers and the thermoplastic resins contained in the resin composition layer (B).

In this case, if the fillers are used in the amount below the lower limit, on the one hand, adhesion to the resin composition layer (A) may be impaired and, if the fillers are used in the amount beyond the upper limit, on the other hand, adhesion to the thermoplastic resin layer (C) as well as moldability may be reduced. The composition of the resin composition layer (B) is preferred to be similar to or close to that of the layer (A) in terms of thermal resistance, toughness, readiness to burn, and the like.

A thickness of the layer (B) may be usually from 10 to 300 $\mu$m, preferably from 15 to 250 $\mu$m. It is to be noted, however, that the total thickness of the resin composition layer (B) and the thermoplastic resin layer (C) may be as thick as usually more than 40 $\mu$m, preferably more than 50 $\mu$m.

Structure of Laminated Material

The laminated material according to the present invention has the resin composition layer (B) as a binder layer or an intermediate layer between the resin composition layer (A) and the thermoplastic layer (C).

As shown in FIG. 1, the laminated material may be of a five-layer construction in which the resin composition layer (B) is laminated on both surfaces of the resin composition layer (A) and the thermoplastic resin layer (C) is further laminated on both outer surfaces of the resin composition layers (B). Referring to FIG. 2, the laminated material is shown to be of a three-layer construction in which the resin composition layer (B) is laminated on the resin composition layer (A) and then the thermoplastic resin layer (C) is laminated on the resin composition layer (B). For the three-layer construction of the laminated material, a gas barrier layer may additionally be laminated on the surface of the layer (A) opposite to the surface on which the layer (B) is laminated, leading to the laminated material of a four-layer construction. The resin composition layer (A) may also be laminated on the gas barrier layer of the four-layered material, thus forming the laminated material of a five-layer construction. Furthermore, the laminated material of a six-layer construction may be prepared by laminating the resin composition layer (A) and the thermoplastic resin layer (C) on the gas barrier layer. An adhesive resin or an adhesive resin layer may be provided, as needed, on a surface of the layer which is brought into contact with the gas barrier layer.

For the gas barrier layer, there may be used any resin that has at least a small degree of oxygen permeability and that is readily moldable and such a resin may include, for example, poly[vinyl chloride], poly[vinylidene chloride], poly(halogenated) ethylene such as polychloro-polyfluoroethylene, ethylene-vinyl alcohol copolymer, polyamide, polyester and the like.

Peeling Strength Between Layers of Laminated Material

For the laminated material in accordance with the present invention, a peeling strength of the interface between the resin composition layer (A) and the resin composition layer (B) and between the layer (B) and the thermoplastic resin layer (C) may be preferably larger than 1.5 kg/15 mm width or higher in each case.

If the peeling strength is below the lower limit, the resin composition layer (B) may be peeled off from the resin composition layer (A) or from the thermoplastic resin layer (C) when a lid member is peeled off from the closed articles such as containers. A peeling strength may be adjusted by appropriately selecting the kinds and amounts of thermoplastic resins and inorganic fillers in the resin composition layers.

Preparation of Laminated Material

The laminated material according to the present invention may be prepared by multilayer blow or injection molding methods for coextrusion molding, using the T-die or blown film extrusion, lamination methods such as extruding lamination, dry lamination, wet lamination, hot melt lamination or non-solvent lamination or the like.

The coextrusion molding method is particularly preferred to mold a laminated sheet from the laminated material according to the present invention.

Preparation of Laminated Articles

The laminated articles according to the present invention may be prepared by any molding method such as blow molding method or injection molding method and prepared from the laminated sheets by thermoforming methods such as vacuum forming or pressure forming methods.

The laminated articles may be in any form such as containers, such as cups, trays, boxes, bags and the like. The laminated articles such as trays, cups and boxes may be closed by sealing their opening portions with a lid member after the content was accommodated and the articles such as bags may be sealed by heat-fusing their openings. It is preferred that the laminated articles such as containers are formed so as to allow the thermoplastic resin layer (C) to be located at their inner side.

The present invention will be be described more in detail by way of examples in conjunction with the drawings.

EXAMPLE 1

As the thermoplastic resin 1, there were used a mixture of 60% by weight of HDPE (high density polyethylene: Trademark "Idemitsu Polyethylene 520 MB"; melt index, 0.4; density, 0.964 g/cm$^3$) with 40% by weight of PP (polypropylene: Trademark "Idemitsu Polypro E-100G"; melt index, 0.5; density 0.91 g/cm$^2$).

As the inorganic filler 2 was used talc having an average particle size of 12 μm.

Using three extruders each with the screw size of 50 mm, 50 mm, and 65 mm with a feed block and a flat die, a laminated sheet with five layers was molded in such a manner that the first thermoplastic resin layer (C) was juxtaposed as an outermost layer on the first resin composition layer (B) which, in turn, was laminated on the resin composition layer (A) and that this layer (A) was juxtaposed on the second resin composition layer (B) interposed with the second thermoplastic resin layer (C) as another outermost layer.

The amount of the thermoplastic resin 1 contained in the resin composition layer (A) was 50% by weight and the amount of the inorganic filler 2 therein was 50% by weight. And a thickness of the resin composition layer (A) was 800 μm. The amount of the thermoplastic resin 1 in the resin composition layer (B) was 75% by weight and the amount of the inorganic filler 2 therein was 25% by weight. And a thickness of each of the layers (B) was 50 μm. The thermoplastic resin layer (C) was constituted by the thermoplastic resin only and a thickness of this layer was each 50 μm. A total weight of the inorganic filler in all the layers was 44% by weight.

The resulting laminated sheet was evaluated by the following test methods.

Peeling Strength

The resulting laminated sheet was cut into 15 mm wide strips. The strips were tested for a peeling strength by previously peeling the interface between one of the resin compositon layer (A) and the resin compositon layer (B) as well as the interface between the resin composition layer (B) and the thermoplastic resin layer (C) by 50 mm and thereafter by pulling the layers at the strength of 300 mm per minute to peel the interfaces.

Punchability

The resulting laminated sheet was punched to form a hole with the diameter of 74 mm using a heat-molding machine (Model: RDM 63/10; manufacturer, Illig AG, W. Germany) immediately after it had been heat-sealed into containers. The laminated sheet was evaluated by counting the number of delamination, i.e., a phenomenon in which the surface layer is torn into skinny layers along the hole punched, and by observing the presence or absence of fluffy filaments extended from the surface layer. The evaluation is rated as "Excellent" (" ◎ ") when neither delamination nor extension of filaments are observed, "Good" (" ○ ") when one or two delaminations per 100 sample containers are observed, and "Poor" ("X") when three or more of delaminations per 100 sample containers are observed.

Peelability from Lid Member

As a lid member was used a biaxially drawn nylon film with a sealant layer which is readily peelable from the layer of the thermoplastic resin 1 and has a peeling strength of 1.5 kg/15 mm width therefrom.

The lid member was heat-sealed with the laminated sheet and then peeled from the sheet by application of artificial force to observe a state of the surface of the laminated sheet from which the lid member was peeled off.

The evaluation is rated as "Excellent" (" ○ ") when the surface state is observed excellent, "Fair" ("Δ") when some degree of delamination is observed, and "Poor" ("X") when the surface layer is torn up.

The evaluation results of the laminated sheet obtained in Example 1 is shown in Table 2 below.

EXAMPLE 2

A laminated sheet with five layers was prepared in substantially the same manner as in Example 1 with the exeption that the resin composition layer (B) comprises 80% by weight of the thermoplastic resin and 20% by weight of the inorganic filler as shown in Table 2 below.

The evaluation results are also shown in Table 2 below.

EXAMPLE 3

A laminated sheet with five layers was prepared in substantially the same manner as in Example 1 with the exception that the resin composition layer (B) comprised 70% by weight of the thermoplastic resin and 30% by weight of the inorganic filler as shown in Table 2 below.

The evaluation results are also shown in Table 2 below.

EXAMPLE 4

A laminated sheet with five layers was prepared in substantially the same manner as in Example 1 with the exception that the resin composition layer (B) comprised 65% by weight of the thermoplastic resin and 35% by weight of the inorganic filler as shown in Table 2 below.

The evaluation results are also shown in Table 2 below.

EXAMPLE 5

A laminated sheet with five layers was prepared in substantially the same manner as in Example 1 with the exception that the resin composition layer (A) comprised 40% by weight of the thermoplastic resin and 60% by weight of the inorganic filler as shown in Table 2 below.

The evaluation results are also shown in Table 2 below.

EXAMPLE 6

A laminated sheet with five layers was prepared in substantially the same manner as in Example 1 with the exception that the resin composition layer (B) comprised 85% by weight of the thermoplastic resin and 15% by weight of the inorganic filler as shown in Table 2 below.

The evaluation results are also shown in Table 2 below.

EXAMPLE 7

A laminated sheet with five layers was prepared in substantially the same manner as in Example 1 with the exception that the resin composition layer (B) comprised 80% by weight of the thermoplastic resin 1 and 20% by weight of the inorganic filler 2 as shown in Table 2 below.

The evaluation results are also shown in Table 2 below.

EXAMPLE 8

A laminated sheet with five layers was prepared in substantially the same manner as in Example 1 with the exception that calcium carbonate in the form of non-scales was used as the inorganic filler in the resin composition layers (A) and (B) as shown in Table 2 below.

The evaluation results are also shown in Table 2 below.

COMPARATIVE EXAMPLE 1

A laminated sheet with five layers was prepared in substantially the same manner as in Example 1 with the exception that the resin composition layer (B) comprised 40% by weight of the thermoplastic resin 1 and 60% by weight of talc as well as the resin compositon layer (A) comprised 50% by weight of the thermoplastic resin and 50% by weight of talc as shown in Table 2 below.

The evaluation results are also shown in Table 2 below.

COMPARATIVE EXAMPLE 2

A laminated sheet with five layers was prepared in substantially the same manner as in Example 1 with the exception that the resin composition layers (A) and (B) comprised each 50% by weight of the thermoplastic resin 1 and 50% by weight of talc as shown in Table 2 below.

The evaluation results are also shown in Table 2 below.

COMPARATIVE EXAMPLE 3

A laminated sheet with five layers was prepared in substantially the same manner as in Example 1 with the exception that the resin composition layer (B) comprised 60% by weight of the thermoplastic resin and 40% by weight of talc and the resin composition layer (A) comprised 50% by weight of the thermoplastic resin and 50% by weight of talc as shown in Table 2 below.

The evaluation results are also shown in Table 2 below.

It is to be noted that the amount of the inorganic filler in all the layers was 46% by weight.

As is apparent from the evaluation results as shown in Table 2 below, the laminated sheet obtained in Comparative Example 3 is found that the peeling strength between the resin composition layers (A) and (B) was 1.4 kg/15 mm width and that the interface between the resin compostion layer (B) and the thermoplastic resin layer (C) was unpeelable. Furthermore, it is found that its punchability and peelability are both rated as "Poor" and that calories for burning the laminated material is 5,700 Cal/gram and its tensile modulus is 22,000 kg/cm$^2$

EXAMPLE 9

As a thermoplastic resin was used a mixture of 60% by weight of HDPE (high density polyethylene; Trademark: "Idemitsu Polyethylene 502 MB"; melt index, 0.4; density, 0.964 g/cm$^3$) and 40% by weight of PP (Polypropylene; Trademark: "Idemitsu Polypro E-100G"; melt index, 0.5; density, 0.91 g/cm$^3$).

The resin compositions as shown in Table 3 below and the mixture of the thermoplastic resin as above were laminated to form a laminated sheet with five layers, as shown in FIG. 1, comprising the resin composition layers (A) and (B) as well as the thermoplastic resin layer (C), using three extruders having each a screw size of 50 mm, 50 mm, and 65 mm with a feed block and a flat die.

The resin composition layer (A) comprised 50% by weight of the thermoplastic resin as above and 50% by weight of talc in the scaly form and with an average particle size of 12 μm as an inorganic filler. A thickness of the layer (A) was 800μm. The resin composition layer (B) comprised 50% by weight of the thermoplastic resin as above and 50% by weight of calcium carbonate in the non-scaly form and with an average particle size of 2 μm. A thickness of the layer (B) was 50 μm. The thermoplastic resin layer (C) was constituted by the thermoplastic resin alone. And a thickness of the layer (C) was 50 μm.

The resulting laminated sheet was evaluated for its peeling strength, punchability, and peelability from a lid member in the same manner as in Example 1 above.

The evaluation results are shown in Table 3 below. A tensile modulus was measured in accordance with JIS K6301.

EXAMPLE 10

A laminated sheet with five layers was prepared in substantially the same manner as in Example 9 with the exception that the resin composition layer (B) comprised 40% by weight of the thermoplastic resin as above and 60% by weight of calcium carbonate as shown in Table 3 below.

The evaluation results are also shown in Table 3 below.

EXAMPLE 11

A laminated sheet with five layers was prepared in substantially the same manner as in Example 9 with the exception that the resin compostion layer (B) comprised 60% by weight of the thermoplastic resin as above and 40% by weight of calcium carbonate as shown in Table 3 below.

The evaluation results are also shown in Table 3 below.

EXAMPLE 12

A laminated sheet with five layers was prepared in substantially the same manner as in Example 9 with the exception that the resin compositon layer (B) comprised 70% by weight of the thermoplastic resin as above and 30% by weight of calcium carbonate as shown in Table 3 below.

The evaluation results are also shown in Table 3 below.

EXAMPLE 13

A laminated sheet with five layers was prepared in substantially the same manner as in Example 9 with the exception that the resin composition layer (B) comprised 80% by weight of the thermoplastic resin as above and 20% by weight of calcium carbonate and the resin composition layer (A) comprised 40% by weight of the thermoplastic resin as above and 60% by weight of talc as shown in Table 3 below.

The evaluation results are also shown in Table 3 below.

COMPARATIVE EXAMPLE 4

A laminated sheet with five layers was prepared in substantially the same manner as in Example 9 with the exception that the resin composition layer (B) comprised 90% by weight of the thermoplastic resin and 10% by weight of calcium carbonate as shown in Table 3 below.

The evaluation results are also shown in Table 3 below.

COMPARATIVE EXAMPLE 5

A laminated sheet with five layers was prepared in substantially the same manner as in Example 9 with the exception that the resin compostion layers (A) and (B) comprised each 50% by weight of the thermoplastic resin and 50% by weight of calcium carbonate as shown in Table 3 below.

The evaluation results far also shown in Table 3 below.

COMPARATIVE EXAMPLE 6

A laminated sheet with five layers was prepared in substantially the same manner as in Example 9 with the exception that the resin composition layers (A) and (B) comprise each 70% by weight of the thermoplastic resin and 30% by weight of calcium carbonate as shown in Table 3 below.

The evaluation results are also shown in Table 3 below.

COMPARATIVE EXAMPLE 7

A laminated sheet with five layers was prepared in substantially the same manner as in Example 9 with the exception that the resin compositon layer (B) comprised 50% by weight of the thermoplastic resin and 50% by weight of talc and the resin composition layer (A) comprised 50% by weight of the thermoplastic resin and 50% by weight of calcium carbonate as shown in Table 3 below.

The evaluation results are also shown in Table 3 below.

From the evaluation results as shown in Table 3 below, the laminated sheet obtained in Comparative Example 4 was found poor in peeling strength between the layers (A) and (B) and in punchability; the laminated sheets obtained in Comparative Examples 5 and 6 was found poor in tensile modulus; and that obtained in Comparative Example 7 was found poor in the delaminating strength between the layers (C) and (B) and punchability.

In accordance with the present invention, the laminated material and the laminated sheet are provided which have excellent characteristics in respect of anti-impact strength, punchability, and peelability from a lid member while maintaining remarkable characteristics such as thermal reisitance, toughness, oil resistance, resistance to liquation, and readiness to burn to be created by a combination of the layer containing the thermoplastic resin and a large quantity of the inorganic filler with the layer containing the thermoplastic resin and substantially no inorganic filler.

The laminated materials and sheets according to the present invention may be formed into laminated articles such as packaging containers which are excellent in thermal resistance, toughness, oil resistance, resistance to liquation and readiness to burn as well as in anti-impact strength, punchability and peelability from the lid member.

The laminated articles according to the present invention may be molded in any arbitrary forms, for example, because of remarkable punchability, and may be readily opened by peeling its lid member therefrom when heat-sealed with the lid member.

Thus the laminated materials and the laminated articles according to the present invention are suitable particularly for containers for electric ovens, retort food, and the like.

TABLE 2

| | Resin composition layer (A) | | | Resin composition layer (B) | | | Thermoplastic resin layer (C) | | | Peeling strength (kg/15 mm width) | | | | | |
|---|---|---|---|---|---|---|---|---|---|---|---|---|---|---|---|
| | *1 | *2 | Thickness (μmm) | *1 | *2 | Thickness (μmm) | *1 | *2 | Thickness (μmm) | Between layers (C)&(B) | Between layers (B)&(A) | *3 | *4 | Punchability | Peelability |
| Example 1 | 50 | 50 | 800 | 75 | 25 | 50 | 100 | 0 | 50 | 2.4 | 2.1 | 44 | 5,900 | ◎ | ○ |
| Example 2 | 50 | 50 | 800 | 80 | 20 | 50 | 100 | 0 | 50 | 2.7 | 1.7 | 44 | 5,900 | ◎ | ○ |
| Example 3 | 50 | 50 | 800 | 70 | 30 | 50 | 100 | 0 | 50 | 2.0 | 2.7 | 45 | 5,800 | ○ | ○ |
| Example 4 | 50 | 50 | 800 | 65 | 35 | 50 | 100 | 0 | 50 | 1.7 | 3.7 | 45 | 5,800 | ○ | ○ |
| Example 5 | 40 | 60 | 800 | 75 | 25 | 50 | 100 | 0 | 50 | 2.4 | 1.7 | 53 | 4,900 | ◎ | ○ |
| Example 6 | 50 | 50 | 800 | 85 | 15 | 50 | 100 | 0 | 50 | 3.1 | 1.5 | 44 | 5,900 | ○ | ○ |
| Example 7 | 70 | 30 | 800 | 80 | 20 | 50 | 100 | 0 | 50 | 3.0 | Unpeelable | 25 | 7,900 | ◎ | ○ |
| Example 8 | 50 | 50 | 800 | 75 | 25 | 50 | 100 | 0 | 50 | Unpeelable | Unpeelable | 45 | 5,900 | ◎ | ○ |
| Comparative Example 1 | 50 | 50 | 800 | 40 | 60 | 50 | 100 | 0 | 50 | 0.8 | Unpeelable | 47 | 5,600 | x | x |
| Comparative Example 2 | 50 | 50 | 800 | 50 | 50 | 50 | 100 | 0 | 50 | 1.0 | Unpeelable | 46 | 5,700 | x | x |
| Comparative Example 3 | 50 | 50 | 800 | 60 | 40 | 50 | 100 | 0 | 50 | 1.4 | Unpeelable | 46 | 5,700 | x | △ |

*1 Amounts of thermoplastic resins (% by WT)
*2 Amounts of inorganic filler (% by WT)
*3 Amounts of inorganic fillers in laminated material (% by WT)
*4 Calories of burning laminated material (cal/g)

TABLE 3

| | Resin composition layer (A) | | | Resin composition layer (B) | | | Thermoplastic resin layer (C) | | | Peeling strength (Kg/15 mm width) | | | | | | |
|---|---|---|---|---|---|---|---|---|---|---|---|---|---|---|---|---|
| | *1 | *2 | Thickness (μmm) | *1 | *2 | Thickness (μmm) | *1 | *2 | Thickness (μmm) | Between layers (C)&(B) | Between layers (B)&(A) | *3 | *4 | Punchability | Peelability | Tensile modulus (kg/cm²) |
| Example 9 | 50 | 50 | 800 | 50 | 50 | 50 | 100 | 0 | 50 | Unpeelable | 2.2 | 46 | 5,700 | ◎ | ○ | 22,000 |
| Example 10 | 50 | 50 | 800 | 40 | 60 | 50 | 100 | 0 | 50 | Unpeelable | 2.3 | 47 | 5,600 | ◎ | ○ | 22,500 |
| Example 11 | 50 | 50 | 800 | 60 | 40 | 50 | 100 | 0 | 50 | Unpeelable | 2.2 | 46 | 5,700 | ◎ | ○ | 22,000 |
| Example 12 | 50 | 50 | 800 | 70 | 30 | 50 | 100 | 0 | 50 | Unpeelable | 1.9 | 45 | 5,800 | ○ | ○ | 21,000 |
| Example 13 | 40 | 60 | 800 | 80 | 20 | 50 | 100 | 0 | 50 | Unpeelable | 1.7 | 44 | 5,900 | ○ | ○ | 21,000 |
| Compara- | 50 | 50 | 800 | 90 | 10 | 50 | 100 | 0 | 50 | Unpeelable | 1.4 | 43 | 6,000 | x | △ | 20,000 |

TABLE 3-continued

| | Resin composition layer (A) | | | Resin composition layer (B) | | | Thermoplastic resin layer (C) | | | Peeling strength (Kg/15 mm width) | | | | | | |
|---|---|---|---|---|---|---|---|---|---|---|---|---|---|---|---|---|
| | *1 | *2 | Thickness (μmm) | *1 | *2 | Thickness (μmm) | *1 | *2 | Thickness (μmm) | Between layers (C)&(B) | Between layers (B)&(A) | *3 | *4 | Punchability | Peelability | Tensile modulus (kg/cm²) |
| tive Example 4 | | | | | | | | | | | | | | | | |
| Comparative Example 5 | 50 | 50 | 800 | 50 | 50 | 50 | 100 | 0 | 50 | Unpeelable | Unpeelable | 46 | 5,700 | ◎ | ○ | 16,000 |
| Comparative Example 6 | 70 | 30 | 800 | 70 | 30 | 50 | 100 | 0 | 50 | Unpeelable | Unpeelable | 25 | 7,900 | ○ | ○ | 14,000 |
| Comparative Example 7 | 50 | 50 | 800 | 50 | 50 | 50 | 100 | 0 | 50 | 1.0 | 2.1 | 46 | 5,700 | x | ○ | 18,500 |

*1 Amounts of thermoplastic resins (% by WT)
*2 Amounts of inorganic filler (% by WT)
*3 Amounts of inorganic fillers in laminated material (% by WT)
*4 Calories of burning laminated material (cal/g)

What is claimed is:

1. A laminated material comprising:
   a resin composition layer (A) comprising a thermoplastic resin and an inorganic filler, said inorganic filler being in a scaly or non-scaly form and in an amount from 20% to 80% by weight of the total weight of the thermoplastic resin and the inorganic filler;
   a resin composition layer (B) comprising a thermoplastic resin and an inorganic filler, said inorganic filler being in an amount from 30% to 70% by weight of the weight of the inorganic filler contained in said resin composition layer (A), said inorganic filler being in a scaly form when the inorganic filler contained in the resin composition layer (A) is in a scaly form or being in a non-scaly form when the inorganic filler contained in the resin composition layer (A) is in a non-scaly form; and
   a plastic resin layer (C);
   in which said resin composition layer (B) is interposed between said resin composition layer (A) and said thermoplastic resin layer (C).

2. A laminated material comprising:
   a resin composition layer (A) comprising a thermoplastic resin and an inorganic filler in a scaly form, said inorganic filler being in an amount from 20% to 80% by weight of the total weight of the thermoplastic resin and the inorganic filler in the scaly form;
   a resin composition layer (B) comprising a thermoplastic resin and an inorganic filler in a non-scaly form, said inorganic filler being in an amount from 20% to 80% by weight of the total weight of the thermoplastic resin and the inorganic filler in the non-scaly form; and
   a plastic resin layer (C);
   in which said resin composition layer (B) is interposed between said resin composition layer (A) and said thermoplastic resin layer (C).

3. A laminated material as claimed in claim 2, wherein the amount of the inorganic filler in the non-scaly form is from 25% to 70% by weight.

4. A laminated material as claimed in claim 1 or 2, wherein the inorganic filler is talc or calcium carbonate.

5. A laminated material as claimed in claim 1 or 2, wherein said thermoplastic resin is a polyolefinic resin, a poly(vinyl chloride) or a copolymer thereof, a ploystyrene or a copolymer thereof, a thermoplastic polyester resin or a polyamide resin.

6. A laminated material as claimed in claim 1 or 2, wherein a laminated sheet is prepared by coextrusion molding method.

7. A laminated article prepared from a laminated material comprising:
   a resin composition layer (A) comprising a thermoplastic resin and an inorganic filler, said inorganic filler being in a scaly or non-scaly form and in an amont from 20% to 80% by weight of the total weight of the thermoplastic resin and the inorganic filler, a resin composition layer (B) comprising a thermoplastic resin and an inorganic filler, said inorganic filler being in an amount from 30% to 70% by weight of the weight of the inorganic filler contained in said resin composition layer (A), said inorganic filler being in a scaly form when the inorganic filler contained in the resin composition layer (A) is in a scaly form or being in a non-scaly form when the inorganic filler contained in the resin composition layer (A) is in a non-scaly form, and plastic resin layer (C), in which said resin composition layer (B) is interposed between said resin composition layer (A) and said thermoplastic resin layer (C).

8. A laminated article prepared from a laminated material comprising:
   a resin composition layer (A) comprising a thermoplastic resin and an inorganic filler in a scaly form, said inorganic filler being in an amount from 20% to 80% by weight of the total weight of the thermoplastic resin and the inorganic filler in the scaly form, a resin composition layer (B) comprising a thermoplastic resin and an inorganic filler in a non-scaly form, said inorganic filler being in an amount from 20% to 80% by weight of the total weight of the thermoplastic resin and the inorganic filler in the non-scaly form, and a thermoplastic resin layer (C), in which said resin composition layer (B) is interposed between said resin composition layer (A) and said thermoplastic resin layer (C).

9. A laminated article as claimed in claim 7 or 8, wherein said thermoplastic resin layer (C) comprises an inner surface of the laminated article.

* * * * *